(12) United States Patent
Ukropec et al.

(10) Patent No.: US 9,217,345 B2
(45) Date of Patent: Dec. 22, 2015

(54) SOOT BURNING METHOD FOR PARTICULATE FILTERS

(71) Applicant: Ford Global Technologies, LLC, Dearborn, MI (US)

(72) Inventors: Robert Ukropec, Herzogenrath (DE); Alexey A. Dubkov, Novosibirsk (RU); Christoph Boerensen, Raeren (BE); Elmar Riesmeier, Aachen (DE); Mario Balenovic, Waalre (NL); Brendan Patrick Carberry, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 13/923,144

(22) Filed: Jun. 20, 2013

(65) Prior Publication Data

US 2014/0013741 A1    Jan. 16, 2014

(30) Foreign Application Priority Data

Jul. 11, 2012    (EP) ..................... 12175874

(51) Int. Cl.
| | |
|---|---|
| *F01N 3/00* | (2006.01) |
| *F01N 3/029* | (2006.01) |
| *F02B 37/12* | (2006.01) |
| *F01N 3/30* | (2006.01) |
| *F01N 9/00* | (2006.01) |
| *F01N 3/023* | (2006.01) |

(52) U.S. Cl.
CPC .............. *F01N 3/0293* (2013.01); *F01N 3/023* (2013.01); *F01N 3/30* (2013.01); *F01N 9/002* (2013.01); *F02B 37/12* (2013.01); *F01N 2270/04* (2013.01); *F01N 2410/04* (2013.01); *F01N 2900/1602* (2013.01); *Y02T 10/47* (2013.01)

(58) Field of Classification Search
USPC ........... 60/274, 278, 280, 285, 295, 297, 311, 60/605.2, 606
See application file for complete search history.

(56) References Cited

U.S. PATENT DOCUMENTS

| | | | |
|---|---|---|---|
| 6,276,139 B1 * | 8/2001 | Moraal et al. ................ 60/605.2 |
| 6,851,258 B2 * | 2/2005 | Kawashima et al. ........... 60/311 |
| 7,317,530 B2 | 1/2008 | Liphardt et al. | |
| 7,631,492 B2 * | 12/2009 | Suresh et al. .................... 60/295 |

(Continued)

FOREIGN PATENT DOCUMENTS

| | | | |
|---|---|---|---|
| DE | 003225867 | * 1/1984 | ..................... 60/606 |
| DE | 102004046638 A1 | 3/2006 | |

(Continued)

OTHER PUBLICATIONS

ISA European Patent Office, Search Report of EP 12175874.2, Jun. 12, 2012, Germany, 5 pages.

*Primary Examiner* — Binh Q Tran
(74) *Attorney, Agent, or Firm* — Julia Voutyras; Alleman Hall McCoy Russell & Tuttle LLP

(57) ABSTRACT

Methods and systems are provided for regenerating a particulate filter in an engine exhaust, where burning of soot is initiated by introducing additional oxygen into the exhaust gas upstream of the particulate filter where an exhaust temperature exceeds a threshold, a soot burn rate controlled by adjusting pulsing of the additional oxygen. Further, the pulsing of the additional oxygen is introduced via a high-pressure EGR passage during boosted engine conditions.

20 Claims, 6 Drawing Sheets

(56) References Cited

U.S. PATENT DOCUMENTS

| | | |
|---|---|---|
| 7,640,729 B2 * | 1/2010 | Durnholz et al. .............. 60/289 |
| 7,980,061 B2 | 7/2011 | Kleinfeld |
| 7,992,381 B2 | 8/2011 | Sugiarto et al. |
| 8,037,675 B2 | 10/2011 | Tahara et al. |
| 8,046,989 B2 | 11/2011 | VanderGriend et al. |
| 8,127,536 B2 * | 3/2012 | Hosaka ............................ 60/295 |
| 8,627,662 B2 * | 1/2014 | Freund et al. ................... 60/606 |

FOREIGN PATENT DOCUMENTS

| | | |
|---|---|---|
| EP | 0632188 A1 | 1/1995 |
| JP | H07317530 A | 12/1995 |

* cited by examiner

SOOT BURNING METHOD FOR PARTICULATE FILTERS

CROSS REFERENCE TO RELATED APPLICATIONS

The present application claims priority to European Patent Application No. 12175874.2, filed on Jul. 11, 2012, the entire contents of which are hereby incorporated by reference for all purposes.

FIELD

The present invention relates to a method of burning soot in an exhaust particulate filter of a combustion engine to regenerate the particulate filter and to a vehicle, adapted to perform this method.

BACKGROUND AND SUMMARY

Engines may utilize particulate filters in an exhaust system for reducing the amount of soot emissions by trapping soot particles. During the operation of an engine, particulate filters may be regenerated in order to decrease the amount of trapped particulate matter within the filter. However, during engine operation, exhaust gas temperatures may increase and cause damage to the particulate filter.

U.S. Pat. No. 7,640,729 describes an approach with a secondary air flow passage located upstream of a particulate filter. To regenerate the particulate filter, the disclosed method delivers a secondary air flow upstream from the particulate filter based on the particulate filter temperature and particulate matter burn off rate. Further, a temperature sensor is located downstream from the particulate filter in the exhaust passage in order to measure the exhaust gas temperature.

The Inventors have recognized a problem with streaming additional oxygen into the exhaust passage for regeneration of a particulate filter. The flow of additional oxygen into the exhaust passage via a secondary passage may occur at non-optimal times during engine operation. Further, having a temperature sensor downstream from the particulate filter may cause a delay in the shut-off of the additional oxygen flow. Further, the delay may cause an inaccurate reading of the particulate filter temperature resulting in damage to the filter.

In one example, some of the above issues may be addressed by a method comprising, regenerating a particulate filter in an engine exhaust, where burning of soot is initiated by introducing additional oxygen into the exhaust gas upstream of the particulate filter when an exhaust temperature exceeds a threshold, and a soot burn rate is controlled by adjusting pulsing of the additional oxygen introduced based on engine operation. For example, when intake boost pressure is greater than exhaust pressure, pulsed air is introduced via a high-pressure EGR passage. As such, the frequency and/or pulse-width of the additional oxygen pulses may be responsive to operating conditions by adjusting pulsing of the high-pressure EGR valve positioned in the passage. Thus, introduction of additional oxygen via pulses may allow for the soot burning process to be controlled more precisely.

In another example, a temperature sensor may be positioned inside the particulate filter of an engine exhaust passage. In this way, the temperature sensor may be able to make a more precise measurement of the exhaust gas temperature. For example, termination of additional oxygen pulses may occur once the temperature inside the particulate filter reaches a maximal threshold. Therefore, a temperature sensor positioned inside the particulate filter may allow for improved regeneration of a particulate filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
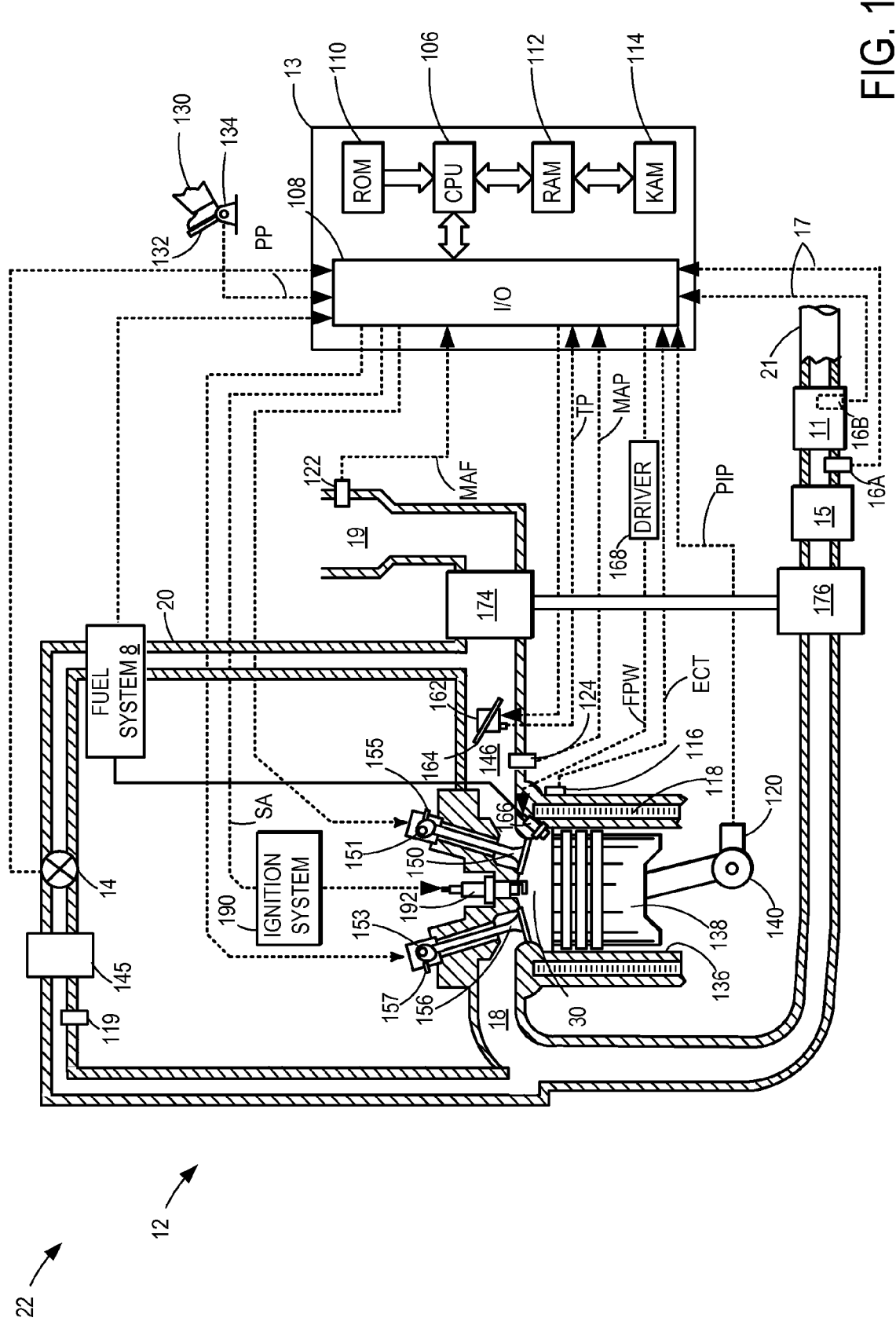
FIG. 1 shows a schematic diagram of an engine system with a regeneration system for particulate filters.
Figure 2:
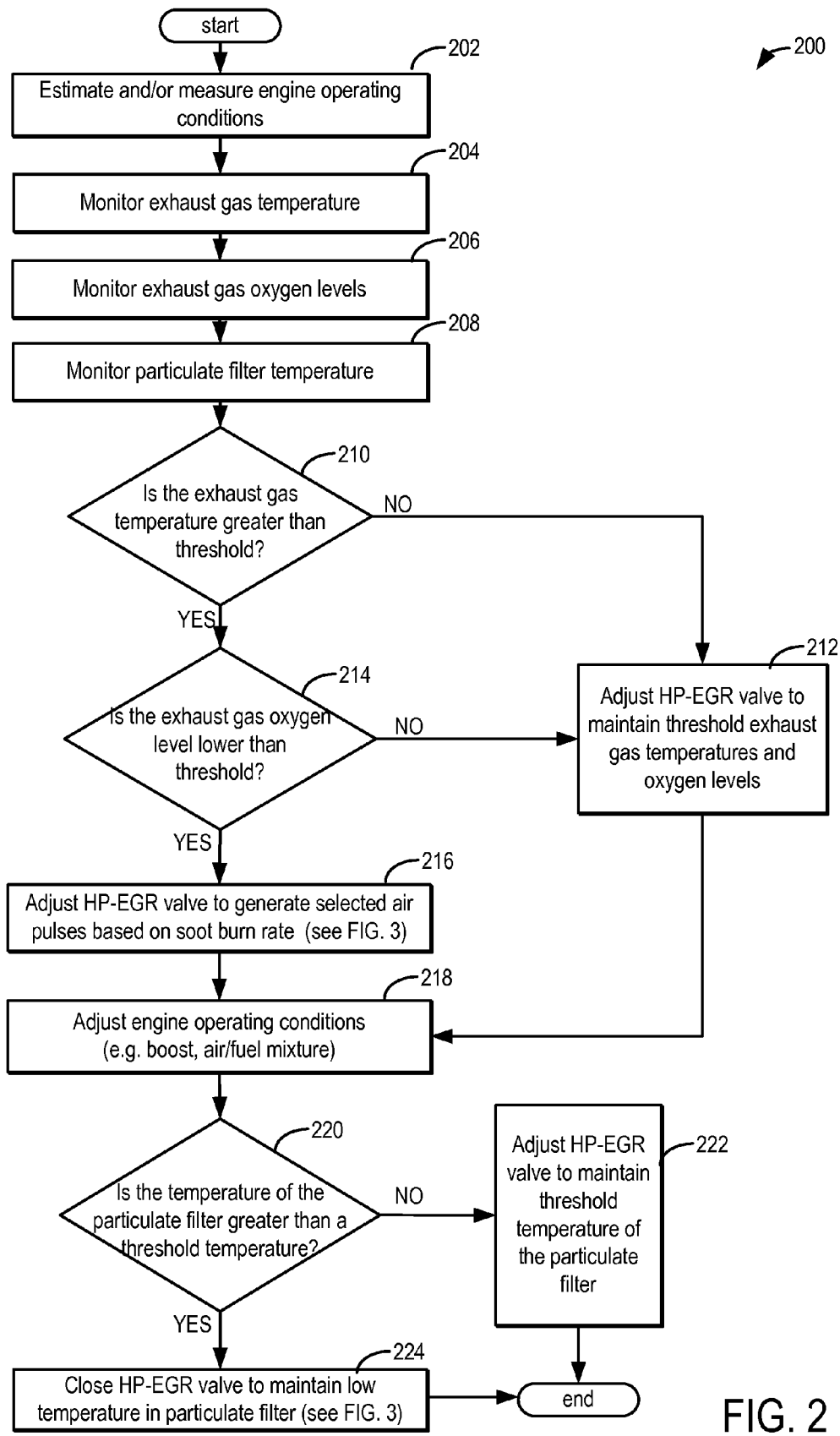
FIG. 2 shows a method for the regeneration of the particulate filter by introducing oxygen rich gas at an appropriate temperature to the exhaust gas upstream of the particulate filter.
Figure 3:
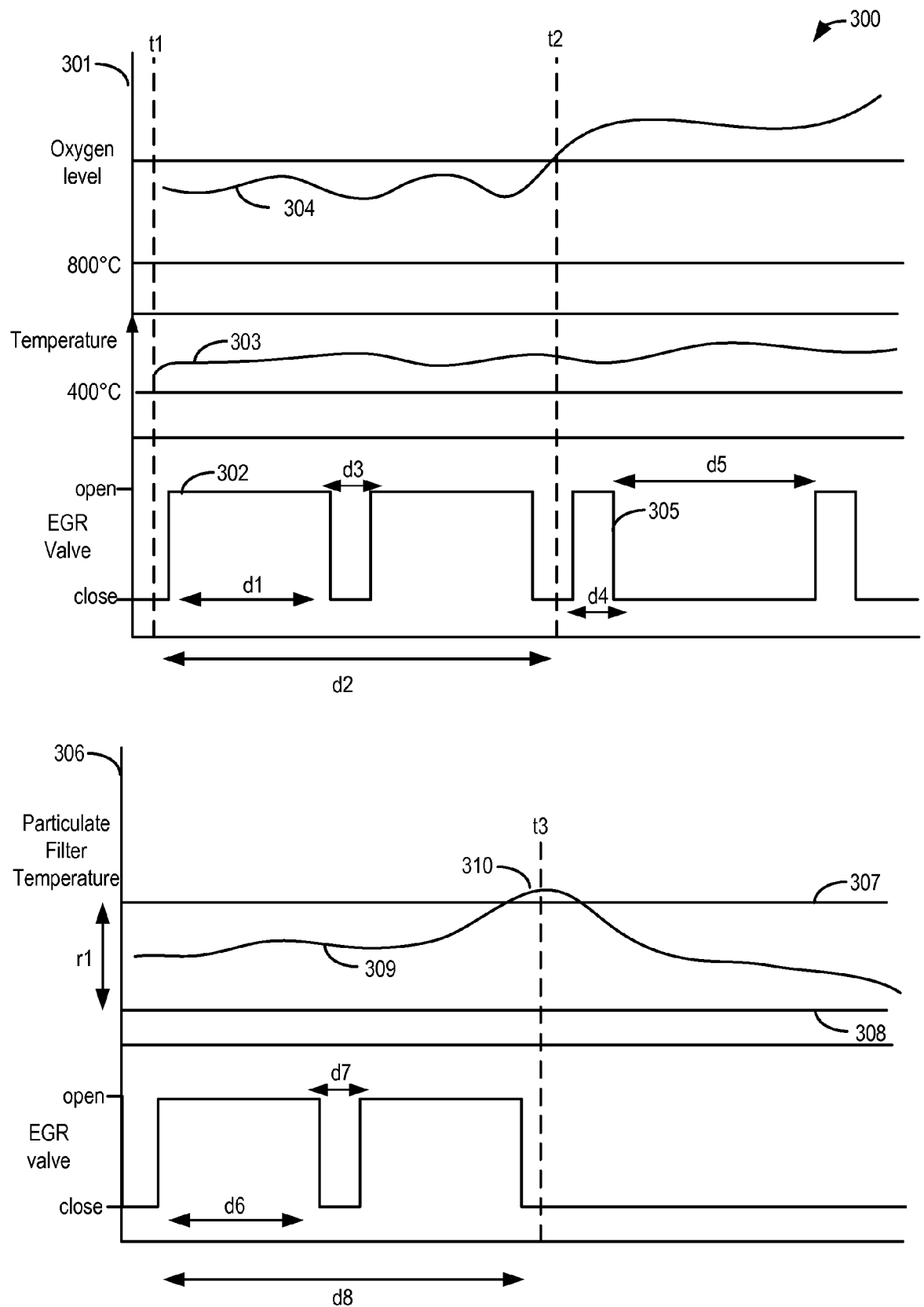
FIG. 3 shows a graphical example of HP-EGR valve operation for regeneration of a particulate filter.

The following description relates to systems and methods for a regeneration system for particulate filters (FIG. 1). Particulate filter regeneration may include monitoring temperature and the level of oxygen present in exhaust gasses in order to initiate a soot burn. However, the exhaust gases may need additional oxygen in order to initiate a soot burn. Therefore, additional oxygen (e.g., in addition to excess oxygen from lean combustion in the cylinders) may be delivered to the exhaust gas passage via pulses by controlling a valve in the HP-EGR system (FIGS. 2-3). Soot burn rates are determined by temperature of the exhaust gas (FIG. 4), the type of soot (e.g. diesel soot vs. commercial soot) (FIG. 5), and the amount of oxygen in the exhaust gas (FIG. 6).

Referring now to FIG. 1, a typical regeneration system 22 for particulate filters is shown. A particulate filter 11 is accommodated in an aftertreatment system of a combustion engine 12. Engine 12 may be controlled at least partially by a control system including controller 13 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 12 may include combustion chamber walls 136 with piston 138 positioned therein. In some embodiments, the face of piston 138 inside cylinder 30 may have a bowl. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 12.

Combustion chamber 30 may receive intake air from intake manifold 146 via intake passage 19 and may exhaust combustion gases via exhaust passage 18. Intake manifold 146 and exhaust passage 18 can selectively communicate with combustion chamber 30 via respective intake valve 156 and exhaust valve 150. In some embodiments, combustion chamber 30 may include two or more intake valves and/or two or more exhaust valves.

Intake valve 156 may be controlled by controller 13 via electric valve actuator (EVA) 151. Similarly, exhaust valve 150 may be controlled by controller 13 via EVA 153. Alternatively, the variable valve actuator may be electro hydraulic or any other conceivable mechanism to enable valve actuation. During some conditions, controller 13 may vary the signals provided to actuators 151 and 153 to control the opening and closing of the respective intake and exhaust valves. The position of intake valve 156 and exhaust valve 150 may be determined by valve position sensors 155 and 157, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 166 is shown coupled directly to combustion chamber 30 for injecting fuel directly therein in proportion to the pulse-width of signal FPW received from controller 13 via electronic driver 168. In this manner, fuel injector 166 provides what is known as direct injection of fuel into combustion chamber 30. The fuel injector may be mounted in the side of the combustion chamber or in the top of the combustion chamber, for example. Fuel may be delivered to fuel injector 166 by a fuel system (not shown) including a fuel tank, a fuel pump, and a fuel rail.

Ignition system 190 can provide an ignition spark to combustion chamber 30 via spark plug 92 in response to spark advance signal SA from controller 13, under select operating modes. Though spark ignition components are shown, in some embodiments, combustion chamber 30 or one or more other combustion chambers of engine 12 may be operated in a compression ignition mode, with or without an ignition spark.

Intake passage 19 may include throttle 162 and a throttle plate 164. In this particular example, the positions of throttle plate 164 may be varied by controller 13 via signals provided to an electric motor or actuator included with throttle 162, a configuration that is commonly referred to as electronic throttle control (ETC). In this manner, throttle 162 may be operated to vary the intake air provided to combustion chamber 30 among other engine cylinders. The positions of throttle plate 164 may be provided to controller 13 by throttle position signals TP. Pressure, temperature, and mass air flow may be measured at various points along intake passage 19 and intake manifold 146. For example, intake passage 19 may include a mass air flow sensor 122 for measuring clean air mass flow. The clean air mass flow may be communicated to controller 13 via the MAF signal.

Engine 12 may further include a compression device such as a turbocharger or supercharger including at least a compressor 174 arranged upstream of intake manifold 146. For a turbocharger, compressor 174 may be at least partially driven by a turbine 176 (e.g., via a shaft) arranged along exhaust passage 18. Thus, the amount of compression provided to one or more cylinders of the engine via a turbocharger may be varied by controller 13.

Downstream of the engine 12 in the exhaust gas passage 18, a catalytic converter 15 is arranged. A controller 13 is connected to the engine 12 via communication lines 17 and to sensors 16A and 16B at least upstream of and downstream of the particulate filter 11. In one embodiment, sensor 16B may be positioned inside particulate filter 11, as shown in FIG. 1. The exhaust gases emitted by the combustion engine 12 are treated firstly in the catalytic converter 15 and subsequently in the particulate filter 11. The exhaust gases leave the regeneration system 22 through the outlet 21. The particulate filter 11 collects particulate matter from the exhaust gases. After a certain time, the particulate filter 11 has to be regenerated. The soot inside the particulate filter 11 has to be converted into carbon dioxide. In order to meet specific requirements a predefined temperature and predefined oxygen level have to be achieved.

Further, oxygen containing gas enters the regeneration system 22 through an inlet 19. Preferably, the oxygen containing gas is fresh air. The fresh air is supplied to the combustion engine 12 and to a high pressure (HP)-EGR passage 20. For example, the fresh air is routed through HP-EGR passage 20 from upstream of turbine 176 to downstream of compressor 174. In another example, the particulate filter is positioned in an exhaust passage downstream from the HP-EGR passage 20. The controller 13 is also connected to HP-EGR valve 14. The HP-EGR passage 20 supplies part of the fresh air directly to the intake of the particulate filter 11. Further, a controller 13 contains instructions stored in non-transitory memory to pulse the HP-EGR valve 14 at a selected frequency and pulse-width to pulse air into the exhaust upstream of the particulate filter 11 during boosted engine operating conditions responsive to filter regeneration.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. Further, followed by air cooler 145, an HP-EGR sensor 119 may be arranged within the HP-EGR passage and may provide an indication of one or more pressure, temperature, and concentration of the exhaust gas.

Exhaust gas sensor 16A is shown coupled to exhaust passage 18 downstream of turbine 176 and upstream of particulate filter 11. Sensor 16A may be any suitable sensor for providing an indication of temperature and/or exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor. Further, sensor 16B, positioned in particulate filter 11, may be any suitable sensor for providing an indication of temperature of the particulate filter.

Controller 13 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 13 may receive various signals from sensors coupled to engine 12, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal, MAP, from sensor 124. Engine speed signal, RPM, may be generated by controller 13 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 120, which is also used as an engine speed sensor, may produce a predetermined number of equally spaced pulses every revolution of the crankshaft.

Storage medium read-only memory 110 can be programmed with computer readable data representing instructions executable by processor 106 for performing the methods described below as well as other variants that are anticipated but not specifically listed.

As described above, the system comprises an internal combustion engine having a turbocharger, an EGR system with an EGR valve, a particulate filter positioned in an exhaust passage downstream from the EGR system, and a controller. A controller may include instructions stored in non-transitory memory to pulse the valve at a selected frequency and pulse-width to pulse air into the exhaust upstream during boosted engine operating conditions responsive to filter regeneration. In one example, the EGR system is a high pressure EGR system. In another example, the exhaust passage includes a temperature sensor upstream from the particulate filter. A temperature sensor may also be an oxygen sensor. In yet another example, the particulate filter includes a temperature sensor.

Referring to FIG. 2, a method of regenerating a particulate filter in an engine exhaust is shown. The burning of soot is initiated by introducing additional oxygen into the exhaust gas upstream of the particulate filter when an exhaust temperature exceeds a threshold (e.g. above 250° C.). The soot burn rate is controlled by adjusting the pulsing of the additional oxygen introduced into the exhaust passage. Thus, controlled introduction of oxygen containing gas is used to control the amount of soot load and soot combustion, thereby protecting the particulate filter against reaching high temperatures.

At 202, the method includes estimating and/or inferring engine operating conditions. These may include, for example, engine speed, engine temperature, catalyst temperature, boost level, MAP, MAF, ambient conditions (temperature, pressure humidity, etc.).

The regeneration method may include three steps including, a first step at 204, monitoring exhaust gas temperatures. A second step of the method may also include monitoring the oxygen level of the exhaust gas, at 206. A third step of the method, at 218, may include monitoring the temperature of the particulate filter. In one example, these three steps are performed by sensors in the exhaust passage upstream and/or downstream of the particulate filter.

The method continues at 210 where it is determined if the exhaust gas temperature is greater than a threshold (e.g. the temperature is greater than 250° C.). If the exhaust gas is greater than a threshold, at 214, it is determined if the exhaust gas oxygen level is lower than a threshold. Therefore, when exhaust gas temperature is high and the oxygen level is low, at 216, the HP-EGR valve is adjusted to generate additional oxygen pulses based on the soot burn rate. Further, the additional oxygen is compressed before it is introduced into the exhaust gas. For example, when the exhaust gas temperature reaches or exceeds a threshold, for instance 250° C., the additional oxygen may be introduced into the exhaust gas by adjusting the HP-EGR valve in order to deliver the oxygen in pulses, thereby initializing a soot burn. In addition, the frequency and/or pulse-width of the pulses may be controlled by the HP-EGR valve in accordance with the desired soot burn rate and/or based on operating conditions (see also FIG. 3). In one example, during boosted particulate filter regeneration conditions, an exhaust gas recirculation valve, responsive to temperature and excess oxygen in the exhaust, may be pulsed in order to deliver intake gasses to the particulate filter. In one example, the pulsed air may be introduced via a high pressure (HP)-EGR passage only when intake boost pressure is greater than exhaust pressure. In addition, the oxygen containing gas may be compressed by a compression unit before introduction into the exhaust passage.

Based on the known soot burn rate at a respective temperature of the exhaust gas, the known oxygen concentration of the inlet gas, and a predicted amount of the soot load, an additionally required amount of oxygen containing gas may be determined by the controller. Therefore, depending on the identified needs of oxygen, the controller initiates a soot burn by either opening the valve (216) and/or regulating the operation of the engine (218). For example, the frequency of the HP-EGR valve pulsing occurs at lower exhaust gas flow rates. In addition, the adjusting of the frequency of HP-EGR valve pulsing may be proportional to engine speed.

Returning to 210, if the exhaust gas temperature is below the threshold, at 210, the HP-EGR is adjusted (e.g. closed) so that no pulsed air is introduced during regeneration or when the filter is not burning soot. Further, the pulsed air introduction is terminated if the exhaust temperature rises above an upper threshold (e.g. 800° C.) based on operating conditions. Additionally, at 214, if the exhaust gas oxygen level is greater than threshold, the HP-EGR is closed and the air introduction is terminated in order to maintain a threshold oxygen level based on operating conditions (e.g. engine load).

The method continues at 220 where it is determined if the temperature of the particulate filter is greater than a threshold temperature. For example, in case the temperature inside the particulate filter exceeds an upper limit, for instance 900° C., the supply of oxygen containing gas is terminated. In one embodiment, for protecting the particulate filter against degeneration due to very high temperatures, the supply of oxygen containing gas may be terminated by closing the HP-EGR valve, a fuel cut may be avoided, or a rich mixture during the time when temperatures are very high may be created. Therefore, if the particulate filter has a temperature greater than 900° C., at 224, the HP-EGR valve may be closed in order to maintain a low temperature in the particulate filter (see also FIG. 3). In one example, the temperature of the particulate filter is measured directly by a sensor inside the filter.

Returning to 220, if the temperature of the particulate filter is less than a threshold, at 222, the HP-EGR valve is adjusted in order to maintain a threshold temperature (e.g. HP-EGR valve is opened).

In this way, a method comprises, during boosted particulate filter regeneration conditions, pulsing an exhaust gas recirculation valve to deliver pulsed intake gasses to the particulate filter responsive to temperature and excess oxygen in the exhaust. In one example, an increase in the frequency of pulsing occurs at lower exhaust gas flow rates. In addition, the frequency of pulsing is proportional to engine speed. In another example, the exhaust gas recirculation valve is positioned in a high-pressure exhaust gas recirculation passage distinct from a low-pressure exhaust gas recirculation passage of the engine. Further, during non-boosted conditions, the exhaust gas recirculation valve is adjusted to control an amount of exhaust gas recirculation delivered to the engine intake in response to a desired amount of exhaust gas recirculation. In yet another example, the pulsing includes oscillating the valve from full open to full closed a selected frequency and a selected pulse-width. The pulse-width may be adjusted based on responsive to particulate filter regeneration rate, particulate filter temperature, and an amount of stored particulate in the particulate filter.

Referring to FIG. 3, a graphical example of HP-EGR valve operation for regeneration of a particulate filter is shown. Plot 301 shows a boosted engine is operating where the boost conditions may include conditions during which the compressor is in operation. For example, the boost condition may include a high engine load condition. During boosted conditions, at 302, a HP-EGR valve may be opened in order to allow excess oxygen to flow into the exhaust passage. For example, at t1, a soot burn may be initiated based on exhaust gas temperatures being above a threshold (303) (e.g. greater than 400° C.) and exhaust gas oxygen levels are low (304). Therefore, at 302, the EGR valve is opened, excess oxygen is pulsed for a set duration of time (d1), at set intervals (d3) and the pluses continue for a duration of time (d2) based on a predetermined soot burn rate. However, at t2, when the oxygen level of exhaust gas starts to increase, at 305, the EGR valve is adjusted in order to reduce the amount of excess oxygen being delivered to the exhaust passage. For example, if the oxygen levels of exhaust gas are high (e.g. engine load increases), the duration of the pulses of oxygen, d4, from the HP-EGR valve is shorter as compared to pulse duration d1. Further, the duration of the pulse intervals, d5, may be longer as compared to pulse interval duration d3 based on the decreased need of excess oxygen to the exhaust passage from the HP-EGR system.

Plot 306 shows a temperature range (r1) with an upper threshold 307 and a lower threshold 308. When the temperature of the particulate filter, at 309, is within a normal temperature range (e.g. below 900° C., above 400° C.) the EGR valve is opened, excess oxygen is pulsed for a set duration of time (d6), with a set interval between pulses (d7), and the pluses continue for a set duration of time (d8). However, at 310, when the temperature of the particulate filter reaches an upper limit temperature range (e.g. above 900° C.), the HP-EGR valve is closed at t3 and excess oxygen is no longer introduced into the exhaust passage.

Figure 4:
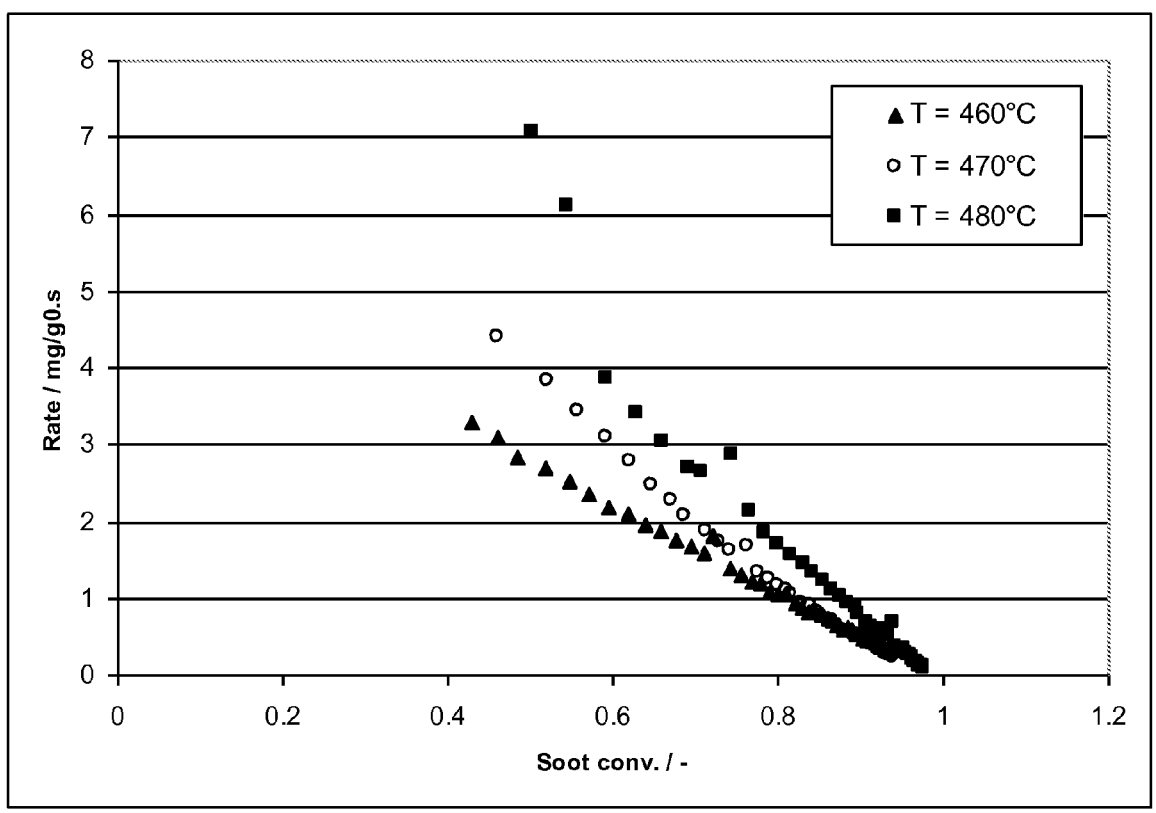
FIG. 4 shows a graphical example of soot oxidation rate vs. soot conversion at different temperatures.

Referring to FIG. 4, a graphical example of soot oxidation rate vs. soot conversion at different temperatures is shown. It was determined that soot oxidation rates increase with increasing temperature.

Figure 5:
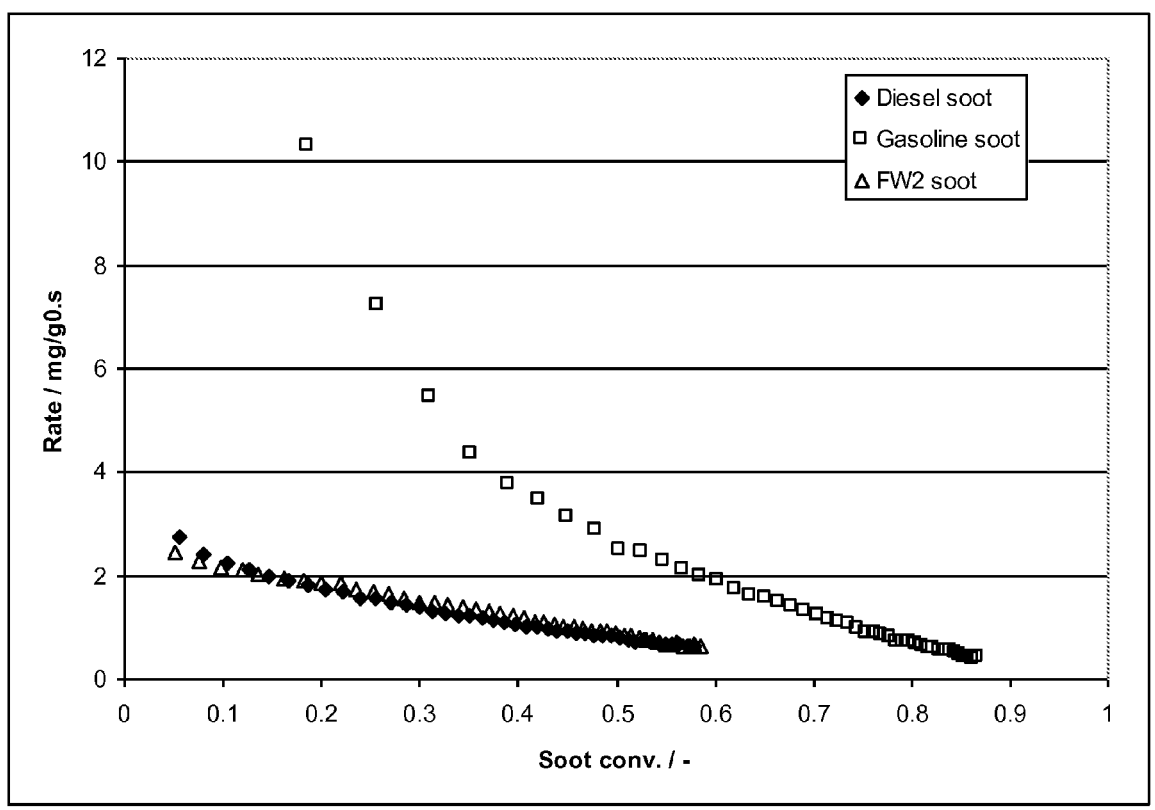
FIG. 5 shows a graphical example of soot oxidation rates vs. soot conversion for FW2 (commercial soot), diesel soot and gasoline soot.
Figure 6:
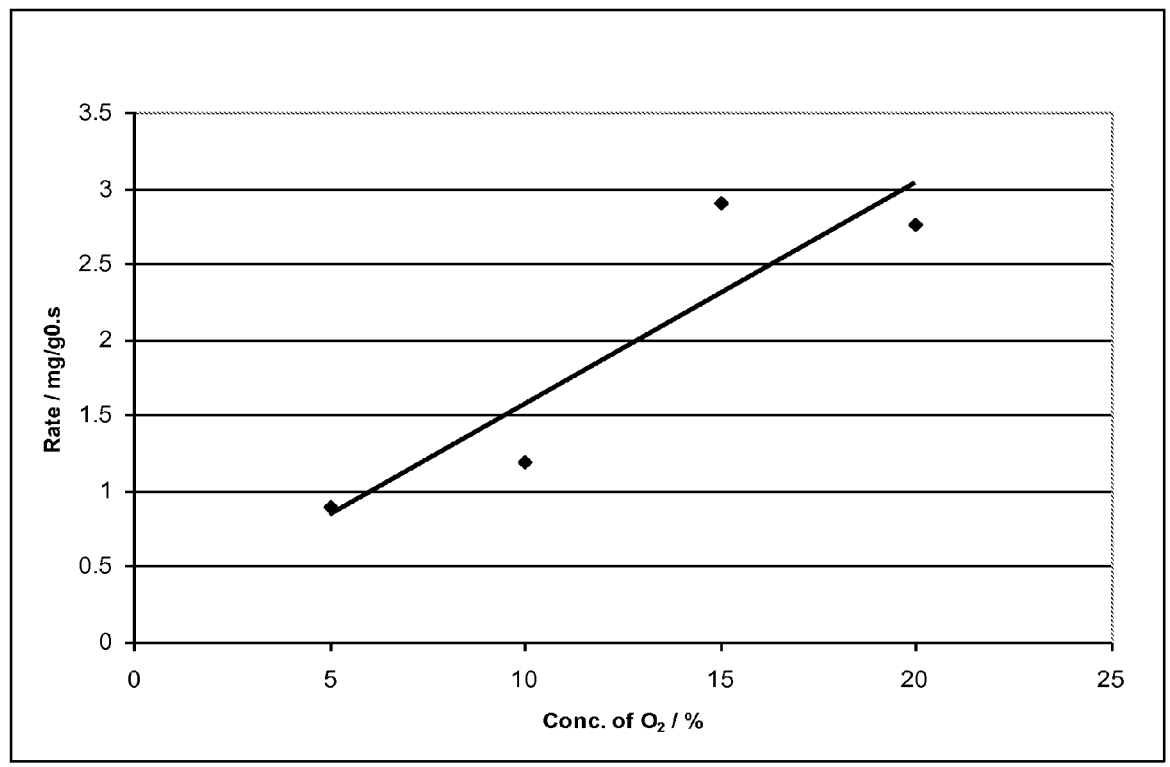
FIG. 6 shows a graphical example of soot oxidation rates vs. $O_2$ concentration at a Temperature of 460° C. and at 50% soot conversion.

Referring to FIG. 5, a graphical example of soot oxidation rates vs. soot conversion for FW2, diesel soot and gasoline soot is shown. FW2 is a type of commercial soot. It was determined that soot oxidation rates decrease with decreasing amounts of soot in the filter.

Referring to FIG. 6, a graphical example of soot oxidation rates vs. $O_2$ concentration at Temperature 460° C. and at 50% soot conversion is shown. It was determined that with increasing concentration of oxygen, the soot oxidation rates increase.

When creating the diagrams, as shown in FIGS. 4, 5, and 6, the concentration of $O_2$ was 2-20 vol. %, and $H_2O$ 10%. Nitrogen was used as a balance. Oxygen was introduced in continuous flow or in pulses. The total flows were set to obtain SV 7.5 k $h^{-1}$. The temperatures of the inlet gases remained constant between 440 to 500° C. for a time period of 4650 s, followed by increasing the temperature up to 800° C. with a temperature ramp of 10° C./min for burning all remaining soot in the particulate filter.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method implemented via a controller with an electronic storage medium, comprising:
   burning soot to regenerate a particulate filter in an engine exhaust when an exhaust temperature exceeds a threshold, wherein the burning of soot is initiated by oscillating an EGR valve arranged in an EGR passage between full open and full closed at a selected frequency and a selected pulse-width to introduce pulses of additional oxygen into exhaust gas upstream of the particulate filter via the EGR passage; and
   controlling a soot burn rate by adjusting the selected frequency and the selected pulse-width.

2. The method of claim 1, further comprising adjusting the selected frequency and the selected pulse-width responsive to operating conditions.

3. The method of claim 1, wherein the threshold is at or above 250° C., and wherein pulses of additional oxygen are not introduced into the exhaust gas upstream of the particulate filter via the EGR passage when the exhaust temperature is below the threshold during regeneration, or when the particulate filter is not burning soot.

4. The method of claim 1, wherein the EGR passage is a high-pressure EGR passage, and wherein the pulses of additional oxygen are introduced via the high-pressure EGR passage when intake boost pressure is greater than exhaust pressure.

5. The method of claim 1, wherein the introduction of pulses of additional oxygen is terminated when exhaust temperature rises above an upper threshold.

6. The method of claim 5, wherein the upper threshold is adjusted based on operating conditions.

7. The method of claim 1, wherein the additional oxygen is compressed before it is introduced into the exhaust gas.

8. A system, comprising:
   an internal combustion engine having a turbocharger;
   an EGR system with an EGR valve;
   a particulate filter positioned in an exhaust passage downstream from the EGR system; and
   a controller with instructions stored in non-transitory memory to oscillate the EGR valve between full open and full closed at a selected frequency and pulse-width to introduce pulses of oxygen into the exhaust passage upstream of the particulate filter during boosted engine operating conditions responsive to particulate filter regeneration.

9. The system of claim 8, wherein the EGR system is a high pressure EGR system.

10. The system of claim 8, wherein the exhaust passage includes a temperature sensor upstream from the particulate filter.

11. The system of claim 10, wherein the temperature sensor is also an oxygen sensor.

12. The system of claim 8, wherein the particulate filter includes a temperature sensor.

13. A method implemented via an engine controller with an electronic storage medium, comprising:
   during boosted particulate filter regeneration conditions, oscillating EGR valve between full open and full closed to deliver pulses of intake gases to a particulate filter responsive to temperature and excess oxygen in an engine exhaust; and
   adjusting a frequency and/or pulse-width of the pulses responsive to operating conditions.

14. The method of claim 13, further comprising increasing the frequency of the pulses at lower exhaust gas flow rates.

15. The method of claim 14, further comprising adjusting the frequency of the pulses to be proportional to engine speed.

16. The method of claim 13, wherein the EGR valve is positioned in a high-pressure EGR passage distinct from a low-pressure EGR passage in an engine.

17. The method of claim 13, wherein during non-boosted conditions, the EGR valve is adjusted to control an amount of recirculated exhaust gas delivered to an engine intake in response to a desired amount of recirculated exhaust gas.

18. The method of claim 17, wherein the pulse-width of the pulses is adjusted responsive to a regeneration rate of the particulate filter, a temperature of the particulate filter, and an amount of stored particulate in the particulate filter.

19. The method of claim 13, further comprising decreasing the pulse-width of the pulses when an oxygen level of engine exhaust gas exceeds a threshold.

20. The method of claim 13, further comprising increasing a duration of intervals between the pulses when an oxygen level of engine exhaust gas exceeds a threshold.

* * * * *